(12) United States Patent
Nakano

(10) Patent No.: US 6,384,181 B1
(45) Date of Patent: May 7, 2002

(54) METHOD OF PRODUCTION POLYAMIDE RESIN WHEREIN CARBOXYLIC ACID-ACTIVATOR AND/OR INORGANIC SALT IS PRESENT IN REACTION SYSTEM THEREFOR

(75) Inventor: Seiko Nakano, Tsu (JP)

(73) Assignee: M & S Research and Development Co., Ltd., Tsu (JP)

(*) Notice: Subject to any disclaimer, the term of this patent is extended or adjusted under 35 U.S.C. 154(b) by 0 days.

(21) Appl. No.: 09/605,898

(22) Filed: Jun. 28, 2000

(30) Foreign Application Priority Data

Jun. 29, 1999 (JP) .......................... 11-184156
Jun. 30, 1999 (JP) .......................... 11-185770

(51) Int. Cl.⁷ .................. C08G 69/26; C08G 69/00; C08G 63/44; C08G 73/10
(52) U.S. Cl. .................. 528/310; 528/170; 528/176; 528/272; 528/288; 528/302; 528/303; 528/308.6; 528/312; 528/317; 528/322; 528/332; 528/335; 528/336; 528/339
(58) Field of Search .................. 528/170, 176, 528/272, 288, 302, 303, 308.6, 332, 335, 310, 312, 317, 322, 336; 525/448, 450, 539

(56) References Cited

U.S. PATENT DOCUMENTS

| | | | |
|---|---|---|---|
| 4,193,896 A | 3/1980 | Cook | 525/437 |
| 5,306,796 A | 4/1994 | Moens et al. | 528/332 |
| 5,837,803 A | * 11/1998 | Nakano | 528/359 |
| 6,107,438 A | * 8/2000 | Nakano | 528/170 |

FOREIGN PATENT DOCUMENTS

| | | |
|---|---|---|
| EP | 0 055 480 | 7/1982 |
| EP | 0 801 090 A1 | 10/1997 |
| EP | 0 906 929 A2 | 4/1999 |
| JP | 9-324037 | 12/1997 |
| JP | 11-106504 | 4/1999 |
| JP | 2000-119391 | 4/2000 |

\* cited by examiner

Primary Examiner—P. Hampton-Hightower
(74) Attorney, Agent, or Firm—Burr & Brown

(57) ABSTRACT

A method of producing a polyamide resin by reacting with at least one diamine compounds at least one linear polyester resin consisting of at least one dicarboxylic acid component and at least one diol component and having an intrinsic viscosity of not less than 0.2 dl/g, so that the at least one diol component of the linear polyester resin is substituted by the diamine compound, resulting in the polyamide resin as a reaction product, wherein the improvement comprises: at least one of a carboxylic acid-activator and an inorganic salt being present in a reaction system of the linear polyester resin and the diamine compound.

30 Claims, No Drawings

METHOD OF PRODUCTION POLYAMIDE RESIN WHEREIN CARBOXYLIC ACID-ACTIVATOR AND/OR INORGANIC SALT IS PRESENT IN REACTION SYSTEM THEREFOR

This application is based on Japanese Patent Application Nos. 11-184156 filed Jun. 29, 1999 and 11-185770 filed Jun. 30, 1999, the contents of which are incorporated hereinto by reference.

BACKGROUND OF THE INVENTION

1. Field of the Invention

The present invention relates in general to a method of producing a polyamide resin, in particular, a linear polyamide resin by using a polyester resin.

2. Discussion of Related Art

Nylon 66, 46, 6T and an aramide resin have been mass-produced as a heat-resistant polyamide resin which exhibits excellent mechanical, chemical and physical properties. In general, these nylon 66, 46, 6T and etc. are produced by dehydration and polycondensation of a nylon salt which is obtained by reaction of an organic dicarboxylic acid and an organic diamine. However, this method requires cumbersome process steps, and the polycondensation needs to be effected at a high temperature for a long period of time. In producing the aramide resin, there are some problems: use of expensive organic dicarboxylic dihalide; corrosion of the reaction device due to halogen; difficulty in recycling the material; and contamination of the environment.

The inventor of the present invention proposed novel methods of producing a linear polyamide resin by using a polyester resin in JP-A-9-324037, JP-A-11-106504, JP-A-2000-119391 and Japanese Patent Application Nos. 11-60267 and 11-119859. These methods are totally different from the above-indicated conventional method of producing the polyamide resin by polycondensation. Explained in detail, according to the proposed methods, the conventionally used organic dicarboxylic acid is replaced with the polyester resin. The polyester resin reacts with, in a predetermined solvent as a reaction medium, a diamine compound whose molar ratio is determined to be in a specified range for the polyester resin. According to the proposed methods, the polyamide resin having a high molecular weight can be obtained in a simplified manner in a relatively short period of time.

When the aramide resin is produced by using the aromatic diamine as the diamine compound according to the above methods, the obtained aramide resin is likely to have a undesirably low degree of yield. Further, it has been found that the polyamide resin tends to be gel or decomposed due to heat applied thereto during polycondensation in a solid state or molten state (i.e., solid-polycondensation or melt-polycondensation), which polycondensation is effected on the polyamide resin obtained after the reaction of the polyester resin and the diamine compound in an attempt to increase the molecular weight of the obtained polyamide resin.

As a result of an extensive study by the inventor, it has been found that addition of a suitable carboxylic acid-activator (i.e., an agent for activating a carboxylic acid) and/or an inorganic salt to the reaction system of the polyester resin and the diamine compound permits the polyamide resin to be obtained by the reaction of the polyester resin and the diamine compound to have a significantly high degree of yield while avoiding or minimizing gelation and decomposition of the obtained polyamide resin even after the polyamide resin has been subjected to the solid-polycondensation or melt-polycondensation. Further, it has been found that the polyamide resin to be obtained has a considerably high molecular weight as well as a sufficiently high degree of yield without suffering from gelation and decomposition, by adding a suitable carboxylic acid-activator and/or an inorganic salt to a reaction product obtained by the reaction of the polyester resin and the diamine compound, and then effecting the solid- or melt-polycondensation on the reaction product to which the carboxylic acid-activator and/or inorganic salt has/have been added.

SUMMARY OF THE INVENTION

It is therefore an object of the present invention to provide a method of producing a polyamide resin by using a polyester resin, which polyamide resin has a high molecular weight suitable for practical use as well as a high degree of yield, while preventing or minimizing gelation and decomposition of the polyamide resin.

The above-indicated object of the present invention may be attained according to a first aspect of the invention, which provides a method of producing a polyamide resin by reacting with at least one diamine compound, at least one linear polyester resin consisting of at least one dicarboxylic acid component and at least one diol component and having an intrinsic viscosity of not less than 0.2 dl/g, so that the at least one diol component of the linear polyester resin is substituted by the diamine compound, resulting in the polyamide resin as a reaction product, wherein the improvement comprises: at least one of a carboxylic acid-activator and an inorganic salt being present in a reaction system of the linear polyester resin and the diamine compound.

In the method according to the above first aspect of the present invention, the carboxylic acid-activator and/or the inorganic salt is/are present in a reaction system of the predetermined linear polyester resin and the diamine compound which are used in respectively determined amounts, whereby the polyamide resin to be obtained has a significantly high molecular weight and a significantly high degree of yield. Further, the thus obtained polyamide resin is not likely to suffer from gelation or decomposition even after the polyamide resin has been subjected to the solid- or melt-polycondensation for increasing its molecular weight.

In a first preferred form of the above first aspect of the invention, the linear polyester resin reacts with the diamine compound in a reaction medium comprising at least one solvent selected from aprotic solvents.

In a second preferred form of the above first aspect of the invention, the method further comprises a step of effecting polycondensation in a solid state or molten state on the reaction product. By effecting the solid- or melt-polycondensation on the polyamide resin obtained by the reaction, the polymerization degree of the polyamide resin is sufficiently increased, whereby the polyamide resin has an industrially effectively high molecular weight. In addition, the polyamide resin produced according to the present invention is not likely to suffer from gelation and decomposition after it has been subjected to the solid- or melt-polycondensation, so that the produced polyamide resin can be employed for a considerably wide variety of applications.

In a third preferred form of the above first aspect of the present invention, the carboxylic acid-activator is used in an amount of 0.01–0.5 mol per 1 mol of the linear polyester resin as calculated in the repeating unit thereof.

In a fourth preferred form of the above first aspect of the present invention, the inorganic salt is used in an amount of 0.1–30 parts by weight per 100 parts by weight of the aprotic solvent.

In a fifth preferred form of the above first aspect of the invention, the method further comprises a step of melting and kneading reaction materials which include the linear polyester resin, the diamine compound, and the at least one of the carboxylic acid-activator and the inorganic salt.

According to this arrangement, the linear polyester resin and the diamine compound react with high efficiency without using a specific solvent as a reaction medium, so that the polyamide resin to be obtained has a molecular weight which is equal to or even higher than that of the polyamide resin obtained by using the reaction medium. This arrangement reduces a cost for producing the polyamide resin, and eliminates a problem of environmental contamination which would be caused by leakage of the solvent from the reaction equipment, for instance.

In a preferred arrangement of the above fifth form of the first aspect of the invention, the diamine compound is used in an amount of 0.05–1.5 mol per 1 mol of the linear polyester resin as calculated in the repeating unit thereof. This arrangement advantageously permits production of the polyamide resin having a high molecular weight suitable for practical use.

In a preferred arrangement of the above fifth form of the first aspect of the invention, the carboxylic acid-activator is used in an amount of 0.001–0.2 mol per 1 mol of the linear polyester resin as calculated in the repeating unit thereof.

In a preferred arrangement of the above fifth form of the first aspect of the invention, the inorganic salt is used in an amount of 0.01–10 parts by weight per 100 parts by weight of the linear polyester resin.

Owing to the use of the carboxylic acid-activator and/or the inorganic salt in respectively determined amounts described above, the polyamide resin to be produced has a high degree of yield while avoiding or minimizing its gelation and decomposition.

In a preferred arrangement of the above fifth form of the first aspect of the invention, the step of melting and kneading the reaction materials is effected while adding the diamine compound to the linear polyester resin at least two times until an amount of the diamine compound added to the linear polyester resin is equal to a required amount for reaction with the linear polyester resin.

In a preferred arrangement of the above fifth form of the first aspect of the invention, the step of melting and kneading the reaction materials is effected after mixing the linear polyester resin in a powder form with the diamine compound, and heating the reaction materials at a temperature in a range between a temperature not lower than a melting point of the diamine compound and a temperature not higher than a melting point of the polyester resin, so as to effect a preliminary reaction between the linear polyester resin and the diamine compound.

In a preferred arrangement of the above fifth form of the first aspect of the invention, the step of melting and kneading the reaction materials is effected in an atmosphere of an inert gas.

In a sixth preferred form of the above first aspect of the invention, the linear polyester resin is used in a powder form and reacts with the diamine compound at a temperature in a range between a temperature not lower than a melting point of the diamine compound and a temperature not higher than a melting point of the linear polyester resin. According to this arrangement, the linear polyester resin and the diamine compound react with high efficiency without using a specific solvent as a reaction medium, so that the polyamide resin to be obtained has a significantly high molecular weight.

Preferably, the linear polyester resin reacts with the diamine compound in an atmosphere of an inert gas.

Preferably, a thermoplastic polyalkylene terephthalate resin is used as the linear polyester resin, and a polyethylene terephthalate resin is used as the thermoplastic polyalkylene terephthalate resin.

The above-indicated object of the present invention may also be attained according to a second aspect of the invention, which provides a method of producing a polyamide resin comprising the steps of: reacting with at least one diamine compound, at least one linear polyester resin consisting of at least one dicarboxylic acid component and at least one diol component and having an intrinsic viscosity of not less than 0.2 dl/g, the linear polyester resin and the diamine compound being reacted in a reaction medium comprising at least one solvent selected from aprotic solvents, so that the at least one diol component of the linear polyester resin is substituted by the diamine compound, so as to provide a reaction product; adding at least one of a carboxylic acid-activator and an inorganic salt to the reaction product; and effecting polycondensation in a solid state or molten state on the reaction product to which at least one of the carboxylic acid-activator and the inorganic salt has been added.

In the method according to the above second aspect of the invention, the carboxylic acid-activator and/or the inorganic salt is/are added to the reaction product obtained by reaction of the predetermined linear polyester resin and the diamine compound which react in respectively determined amounts in the predetermined solvent, and the solid- or melt-polycondensation is effected on the reaction product to which the carboxylic acid-activator and/or the inorganic salt has/have been added. The present arrangement permits production of the polyamide resin having a high degree of yield as well as a remarkably high molecular weight suitable for practical use. In addition, the polyamide resin obtained according to this arrangement is not likely to suffer from gelation and decomposition which would otherwise be caused by the solid- or melt-polycondensation.

In a first preferred form of the above second aspect of the invention, the carboxylic acid-activator is used in an amount of 0.1–20 parts by weight per 100 parts by weight of the reaction product.

In a second preferred form of the above second aspect of the invention, the inorganic salt is used in an amount of 0.1–10 parts by weight per 100 parts by weight of the reaction product.

Preferably, a thermoplastic polyalkylene terephthalate resin is used as the linear polyester resin, and a polyethylene terephthalate resin is used as the thermoplastic polyalkylene terephthalate resin.

DETAILED DESCRIPTION OF PREFERRED EMBODIMENTS

There will be described a method of producing a polyamide resin according to one embodiment of the present invention, wherein the linear polyester resin reacts with the diamine compound in the presence of a specific solvent as the reaction medium described below.

The linear polyester resin used in the present method is obtained by polycondensation of a dicarboxylic acid component formed of an organic dicarboxylic acid or its derivative, and a diol component formed of a dihydric alcohol compound or dihydric phenol compound. Examples of the organic dicarboxylic acid or its derivative are: an aromatic dicarboxylic acid and its derivative such as terephthalic acid, isophthalic acid, phthalic acid, dimethyl terephthalate, terephthalic acid dichloride, diphenyl dicarboxylic acid or naphthalene dicarboxylic acid; and an aliphatic dicarboxylic acid and its derivative such as oxalic acid, succinic acid, adipic acid, sebacic acid, maleic acid and fumaric acid. Examples of the dihydric alcohol compound are: alkylene glycol such as ethylene glycol, propylene glycol, butane-1, 3-diol, butane-1,4-diol and tetramethylene glycol; and cyclohexanediol. As the dihydric phenol compound, bisphenol A is used, for instance. Any one of, or any combination of, those dicarboxylic acid components may be used. Similarly, any one of, or any combination of, the diol components as described above may be used.

In the present method, it is preferable to use, as the linear polyester resin, a thermoplastic polyalkylene terephthalate resin which is formed of the terephthalic acid as the dicarboxylic acid, and the alkylene glycol as the dihydric alcohol, such as ethylene glycol or butane-1,4-diol. It is more preferable to use a polyethyleneterephthalate resin (hereinafter referred to as "PET" resin), in particular, a recycled PET resin.

In the present method, two or more of the linear polyester resins may be used in combination. Further, the polyester resin may contain an organic polymer or an inorganic compound.

The polyester resin used in the present method needs to have an intrinsic viscosity of not less than 0.2 dl/g, preferably not less than 0.3 dl/g, as measured at the temperature of 30° C. by using hexafluoroisopropanol (hereinafter referred to as HFIP) as the solvent. The intrinsic viscosity of the polyester resin lower than the lower limit of 0.2 dl/g undesirably lowers the intrinsic viscosity of the polyamide resin to be obtained. In this case, the polymerization degree of the polyamide resin is not sufficiently increased even after the polyamide resin has been subjected to the solid-polycondensation or the melt-polycondensation. Therefore, the obtained polyamide resin does not have an industrially effectively high molecular weight.

Although the form of the polyester resin used in the present method is not particularly limited, it is preferable that the polyester resin be in the form of a powder having an average grain size of not larger than 1 mm. The water content of the polyester resin is generally not more than 500 ppm, preferably not more than 100 ppm.

Examples of the diamine compound which reacts with the linear polyester resin are the following: aliphatic diamines such as ethylene diamine, trimethylene diamine, 1,2-propane diamine, tetramethylene diamine, pentamethylene diamine, hexamethylene diamine, octamethylene diamine, dodecamethylene diamine, and 2,2,4-trimethyl hexamethylene diamine; aromatic diamines such as p-phenylene diamine. o-phenylene diamine, m-phenylene diamine, m-toluylene diamine, p-xylylene diamine, m-xylylene diamine, 4,4'-diamino biphenyl, 3,3'-dimethyl-4,4'-diamino biphenyl, 3,3'-dichloro-4,4'-diamino biphenyl, 4,4'-diamino diphenyl ether, 3,4'-diamino diphenyl ether, 4,4'-diamino diphenyl propane, 4,4'-diamino diphenyl sulfone, 4,4'-diamino diphenyl sulfide, 4,4'-diamino benzanilide, 3,3'-dimethyl-4,4'-diamino diphenyl methane, 3,3'-diethyl-4,4'-diamino diphenyl methane, 4,4'-diamino anthraquinone, 3,3'-dimethoxybenzidine, α,α'-bis(4-aminophenyl)-p - isopropylbenzene, 1,5-diamino naphthalene, and 2,6-diamino naphthalene; alicyclic diamines such as 1,3-diamino cyclohexane, 1,4-diamino cyclohexane, 1,3-bis (aminomethyl)cyclohexane, isophorone diamine, piperazine, 2,5-dimethyl piperazine, bis(4-aminocyclohexyl) methane, bis(4-aminocyclohexyl) propane, 4,4'-diamino-3,3'-dimethyl dicyclohexylmethane, α,α'-bis(4-aminocyclohexyl)-p-diisopropylbenzene, α,α'-bis(4-aminocyclohexyl)-m-dilisopropylbenzene, and menthane diamine. In addition, polymers each having amino groups at its opposite ends are used as the diamine compound. Examples of such polymers include polydimethyl siloxane, polyamide, and polyalkylene oxide, each of which has amino groups at its opposite ends. Any one of, or any combination of, the diamine compounds as described above may be used.

In the reaction of the linear polyester resin and the diamine compound in the presence of the reaction medium as described below, the amount of the diamine compound to be used is in the range of 0.01–1.5 mol, preferably in the range of 0.02–1.3 mol, more preferably in the range of 0.03–1.2 mol, for 1 mol of the linear polyester resin as calculated in the repeating unit thereof. If the amount of the diamine compound is less than 0.01 mol, the obtained polyamide resin does not exhibit desired properties. On the other hand, if the amount of the diamine compound exceeds 1.5 mol, the molecular weight of the obtained polyamide resin is undesirably low. Further, the use of the diamine compound in an amount exceeding 1.5 mol does not significantly enhance the effect to be achieved. The water content of the diamine compound is generally not more than 500 ppm, preferably not more than 100 ppm.

The reaction medium used in the amidation reaction between the linear polyester resin and the diamine compound according to the present method is selected from aprotic solvents which include: aliphatic, aromatic, aliphatic-aromatic, or alicyclic hydrocarbons such as n-butane, i-butane, n-pentane, 2-methylbutane, 2,2-dimethylpropane, 2-methylpentane, 3-methylpentane, 2,2-dimethylbutane, n-hexane, 2-methylpentane, 2,3-dimethylbutane, n-heptane, 2-methylhexane, 3-methylhexane, 2,3-dimethylpentane, n-octane, n-nonane, n-decane, i-decane, n-tridecane, benzene, toluene, xylene, ethylbenzene, cumene, n-propylbenzene, n-butylbenzene, n-octylbenzene, dodecylbenzene (linear, branched), cyclopentane, cyclohexane, decalin, tetralin, methylcyclopentane, and methylcyclohexane; halogenated hydrocarbons such as 1,2-dichloroethane, 1,1,1-trichloroethane, chlorobenzene, p-chlorotoluene, o-dichlorobenzene, m-dichlorobenzene, p-dichlorobenzene, 3,4-dichlorotoluene and 1,2,3-trichlorobenzene; ethers such as diethylether, dipropylether, dibutylether, dihexylether, ethylvinylether, butylvinylether, anisole, phenetole, butylphenylether, pentylphenylether, methoxytoluene, benzylethylether, diphenylether, dibenzylether, trioxane, 2-methylfuran, tetrahydrofuran, tetrahydropyran, 1,2-dimethoxyethane, 1,2-diethoxyethane, 1,2-dibutoxyethane, diethyleneglycoldimethylether, diethyleneglycoldiethylether, diethyleneglycoldibutylether, triethyleneglycoldiethylether; acetals such as diethylacetal; acetonitrile; sulfolane; 3-sulfolane; N-methylpyrrolidone; 2-pyrrolidone; pyridine; N,N'-dimethylformamide; N,N'-dimethylacetamide; dimethylsulfoxide; and hexamethylenephosphoric triamide.

Any one of, or any combination of, the above-indicated solvents may be used. In the present invention, petroleum ether, petroleum benzine, gasoline, kerosene or solvent naphtha may be used as the reaction medium. It is not preferable to use, as the reaction medium of the present invention. aldehydes, ketones, esters, carboxylic acids, alcohols, phenol solvent, and water which are usually used as the solvent since these solvents tend to react with the diamine compound or hydrolyze the polyester resin. The water content of the solvent as the reaction medium is generally not more than 1000 ppm, preferably not more than 500 ppm, more preferably not more than 100 ppm. The amount of the reaction medium is in the range of 100–5000 parts by weight, preferably 200–3000 parts by weight, per 100 parts by weight of the polyester resin. If the amount of the reaction medium is less than 100 parts by weight, the polyester resin is not sufficiently dispersed in the reaction medium, and the reaction does not proceed homogeneously. On the other hand, the amount of the reaction medium exceeding the upper limit of 5000 parts by weight makes the reaction system dilute, so that the reaction of the polyester resin and the diamine compound does not sufficiently proceed.

In producing the desired polyamide resin by reaction of the linear polyester resin and the diamine compound in the presence of the reaction medium, the linear polyester resin and the diamine compound as the reaction material, and the suitably selected solvent as the reaction medium are put into a suitable container having stirring or agitating means, and the mixture is heated, whereby a desired reaction (i.e., ester-amide substitution reaction) proceeds, wherein the diol component in the linear polyester resin is substituted by the diamine compound. The total water content in the reaction system is adjusted to not more than 1000 ppm, preferably not more than 500 pm, more preferably not more than 100 ppm. When the molar amount of the diamine compound is smaller than that of the polyester resin as calculated in the repeating unit thereof, the reaction product to be obtained is a so-called polyester amide copolymer having the ester bonds as well as the amide bonds. In the present invention, this polyesteramide copolymer is also referred to as the polyamide resin.

The temperature at which the reaction between the linear polyester resin and the diamine compound in the reaction medium is effected varies depending upon the reaction pressure, reaction time, agitating state of the mixture in the reactor as well as the amount and kinds of the reaction materials to be used. In general, the reaction temperature is not lower than 100° C., preferably not lower than 120° C. If the reaction temperature is lower than 100° C., it requires a relatively long time period to form the polyamide resin. When the reaction temperature is higher than the boiling point of the solvent to be used (as the reaction medium) and the diamine compound, it is preferable that the reactor be pressure-tightly closed or kept under pressure.

Like the reaction temperature described above, the time period required for the reaction between the linear polyester resin and the diamine compound varies depending upon various factors. In general, the reaction time is in the range of 0.2–100 hours, preferably in the range of 0.5–50 hours. If the reaction time is less than 0.2 hours, the formation of the polyamide resin is insufficient. On the other hand, the reaction time exceeding 100 hours does not significantly enhance the formation of the polyamide resin. It is preferable to remove the by-product which is generated during the reaction from the reaction system at a reduced pressure or in the presence of an inert gas.

In producing the polyamide resin according to the present method, at least one of a carboxylic acid-activator (i.e., an agent for activating a carboxylic acid) and an inorganic salt is introduced into the reactor, whereby the reaction between the linear polyester resin and the diamine compound effectively proceeds in the presence of the carboxylic acid-activator and/or the inorganic salt. The presence of the carboxylic acid-activator and/or the inorganic salt in the reaction system of the linear polyester resin and the diamine compound permits production of the polyamide resin having a relatively high molecular weight and a high degree of yield and prevents gelation and decomposition of the polyamide resin even after the solid- or melt-polycondensation has been effected on the obtained polyamide resin.

While it is not clear why the presence of the carboxylic acid-activator and/or the inorganic salt in the reaction system of the linear polyester resin and the diamine compound provides the advantages described above, the inventor of the present invention speculates as follows. Namely, a portion of the linear polyester resin is hydrolyzed by a trace amount of water existing in the reaction system of the polyester resin and the diamine compound, generating the carboxylic acid which undesirably causes the above-indicated problems of reduction of the yield and gelation and decomposition of the polyamide resin to be obtained. It seems that the addition of the carboxylic acid-activator permits reesterification of the generated carboxylic acid, and removes the trace amount of water from the reaction system while the addition of the inorganic salt permits activation of the diamine compound and improves the solubility of the formed polyamide resin, resulting in an improvement of the yield and the molecular weight of the obtained polyamide resin while avoiding its gelation and decomposition.

The carboxylic acid-activator added to the reaction system of the polyester resin and the diamine compound reacts with the carboxylic acid to form an active acyl intermediate compound such as acid chloride, acid anhydride, or active ester. Examples of the carboxylic acid-activator include: phosphorus compounds such as phosphites, phosphates, phosphorodichloridites, phosphorodichloridates, phosphorochloridites, phosphorochloridates, phosphoroamides, phosphines, phosphinic acids, phosphonous acids, phosphonic acids, diphosphorus pentoxide, phosphorus pentachloride, phosphorus trichloride, and thionyl chloride. In the present embodiment, it is preferable to employ as the carboxylic acid-activator: phosporus esters having at least one aryl group such as aryl phosphite, aryl phosphate, aryl phosphine, aryl phosphinite, aryl phosphinate, aryl phosphonite, aryl phosphonate, diphosphorus pentoxide, phosphorus trichloride, and thionyl chloride.

Examples of the phosphorus ester having at least one aryl group, which is preferably used as the carboxylic acid-activator, include triphenyl phosphite, diphenyl phosphite, trinonylphenyl phosphite, phenyl chlorophosphite, triphenyl phosphate, diphenyl chlorophosphate, triphenyl phosphine, phenyl diphenylphosphinite, phenyl diphenylphosphinate, diphenyl chlorophosphine, phenyl diphenylphosphonite, diphenyl phenylphosphonate, phenylphosphonous acid dichloride, diphenyl-2,3-dihydro-1,3-benzisoxazol-3-ylphosponate, phenyl bis(2,3-dihydro-2-oxobenzothiazol-3-yl) phosphinate, and diphenyl (2,3-dihydro-2-oxo-3-benzothiazolyl) phosphonate. To the caroboxylic acid-activator described above, tertiary amine such as pyridine and triethyl amine may be added as a proton- or an acid-scavenger.

In the reaction of the linear polyester resin and the diamine compound in the specific solvent as the reaction medium, the carboxylic acid-activator is present in the reaction system in an amount of 0.01–0.5 mol, preferably in an amount of 0.05–0.3 mol, per 1 mol of the linear polyester resin as calculated in the repeating unit thereof. If the amount of the carboxylic acid-activator is less than 0.01 mol, the effect to be achieved by the addition of the carboxylic acid-activator is insufficient. On the other hand, an amount of the carboxylic acid-activator exceeding 0.5 mol does not significantly enhance the effect. The water content of the carboxylic acid-activator is generally not more than 500 ppm, preferably not more than 100 ppm.

The inorganic salt present in the reaction system of the linear polyester resin and the diamine compound is a compound wherein metal ions and anions are bonded together so that the positive electric charge of the metal ions and the negative electric charge of the anions are neutralized with each other. The inorganic salt is formed of metal ions such as an alkaline metal ion, alkaline earth metal ion, and transition metal ion, and anions such as chloride ions, bromide ions, and iodide ions. Examples of the inorganic salt include lithium chloride, sodium chloride, potassium chloride, lithium bromide, potassium bromide, lithium iodide, calcium chloride, magnesium chloride, nickel chloride, and copper iodide. In particular, lithium chloride, calcium chloride and copper iodide are preferably employed as the inorganic salt.

In the reaction of the linear polyester resin and the diamine compound in the suitably selected aprotic solvent as the reaction medium, the inorganic salt is present in the reaction system generally in an amount of 0.1–30 parts by weight, preferably in an amount of 0.5–20 parts by weight, per 100 parts by weight of the aprotic solvent as the reaction medium. If the amount of the inorganic salt to be added to the reaction system is less than 0.1 part by weight, the effect to be achieved by the addition of the inorganic salt is insufficient. On the other hand, an amount of the inorganic salt exceeding 30 parts by weight does not significantly enhance the effect. The water content of the inorganic salt is generally not more than 500 ppm, preferably in an amount of 100 ppm.

When the reaction of the linear polyester resin and the diamine compound in the reaction medium in the presence of the carboxylic acid-activator and/or the inorganic salt is completed, the polyamide resin as a reaction product which is present in the reaction medium is separated and collected therefrom. If the polyamide resin is dispersed in the form of a slurry in the reaction medium, the polyamide resin slurry is collected from the reaction medium. If the polyamide resin is dissolved in the reaction medium, the reaction medium is dried by spraying, so as to collect the polyamide resin. Alternatively, the dissolved polyamide resin is deposited by using a suitable precipitant, and then subjected to known filtration or centrifugation to collect the polyamide resin. The thus collected polyamide resin is completely dried according to a known drying method such as hot gas drying or vacuum drying, so as to provide a desired polyamide resin. The thus obtained polyamide resin generally has an intrinsic viscosity in the range of 0.3–3.0 dl/g, and has a yield larger than that of a polyamide resin produced according to the conventional method.

The polyamide resin obtained by the reaction of the linear polyester resin and the diamine compound in the reaction medium in the presence of the carboxylic acid-activator and/or the inorganic salt may be subjected to solid-polycondensation or melt-polycondensation, as needed, for further increasing its molecular weight.

Described more specifically, solid-polycondensation is effected for increasing the degree of polymerization, i.e., the molecular weight, of the obtained polyamide resin while it is kept in a solid state. In this case, the polyamide resin is heated at a temperature within a range between a temperature 50° C. higher than the glass-transition temperature of the polyamide resin and the temperature at which the polyamide resin starts to flow, preferably within a range between a temperature 80° C. higher than the glass-transition temperature and a temperature 20° C. lower than the temperature at which the polyamide resin starts to flow. This heat treatment is effected at a reduced pressure of not more than 1000 Pa, preferably not more than 300 Pa, or in the presence of an inert gas. Although the time period during which the heat treatment is effected varies depending upon the temperature, the amount of the polyamide resin as the reaction product, and the configuration of the device to be used, it is preferable to effect the heat treatment generally for 0.2–20 hours, preferably for 0.5–10 hours.

The melt-polycondensation is effected for increasing the degree of polymerization, i.e., the molecular weight, of the obtained polyamide resin while it is heated and kept in a molten state at a reduced pressure or in the presence of an inert gas. In the melt-polycondensation, the polyamide resin is heated at a temperature within a range between a temperature higher than the temperature at which the reaction product (polyamide resin) starts to flow and a temperature lower than the decomposition temperature of the polyamide resin, preferably in a range between a temperature higher than the temperature at which the reaction product starts to flow by at least 20° C. and a temperature lower than the decomposition temperature of the polyamide resin by at least 30° C. The melt-polycondensation is effected for 0.2–15 minutes, preferably for 0.5–10 minutes. The melt-polycondensation is effected by using any suitable device which is capable of kneading a polymer having a high viscosity under heat, such as a roll, extruder, or kneader. It is preferable to use a vent-type extruder or a kneader which assures easy kneading of the polymer at a high temperature, permits the molecular weight of the polymer to sufficiently increase in a relatively short period of time, and facilitates retrieval of the polymer. As the extruder, a single-screw or multi-screw extruder is used. The reaction by-product is removed through the vent of the extruder at a reduced pressure. Thus, the polyamide resin having a high molecular weight is easily obtained in the form of pellets in a short period of time. The reduced pressure is not higher than 1000 Pa, preferably not higher than 300 Pa.

In the method of producing the polyamide resin according to another aspect of the present invention, the linear polyester resin and the diamine compound as the reaction materials, and the reaction medium are initially introduced into a reactor for reaction between the linear polyester resin and the diamine compound. After the reaction is terminated, a reaction product present in the reaction medium is separated and collected from the reaction medium. Thereafter, the collected reaction product is dried, and at least one of the carboxylic acid-activator and the inorganic salt is added thereto. Then, the reaction product to which the carboxylic acid-activator and/or the inorganic salt has been added is subjected to the solid- or melt-polycondensation as described above. The addition of the carboxylic acid-activator and/or the inorganic salt to the reaction product when it is subjected to the solid- or melt-polycondensation permits the formed polyamide resin to have a significantly enhanced molecular weight and an intrinsic viscosity of not less than 0.3 dl/g as well as a sufficiently high degree of yield while avoiding or minimizing the gelation and the decomposition of the formed polyamide resin.

Examples of the carboxylic acid-activator and the inorganic salt added to the reaction product when it is subjected to the solid- or melt-polycondensation are the same as described above. The amounts of the carboxylic acid-activator and the inorganic salt are suitably determined such that the addition of the carboxylic acid-activator and/or the inorganic salt assures the advantages described above. In view of this, the carboxylic acid-activator is used generally in an amount of 0.1–20 parts by weight, preferably 0.5–10 parts by weight, per 100 parts by weight of the reaction product. The inorganic salt is used generally in an amount of 0.1–10 parts by weight, preferably 0.5–5 parts by weight, per 100 parts by weight of the reaction product. When the amounts of the carboxylic acid-activator and the inorganic salt are less than the respective lower limits, the effect to be achieved by the addition of the carboxylic acid-activator and/or the inorganic salt is insufficient. The amounts of the carboxylic acid-activator and the inorganic salt exceeding the respective upper limits do not significantly enhance the effect obtained by the addition of the carboxylic acid-activator and/or the inorganic salt.

There will be next explained a method of producing a polyamide resin according to another embodiment, wherein the linear polyester resin reacts with the diamine compound without the presence of the reaction medium. According to the present embodiment, the polyamide resin to be obtained has a high molecular weight since the reaction can proceed with high efficiency even without using the reaction medium, by (A) adding, to the linear polyester resin, the diamine compound in steps until the amount of the diamine compound added to the polyester resin is equal to a required amount for reaction with the polyester resin while the mixture of the polyester resin and the diamine compound is melted and kneaded, (B) by mixing the polyester resin in a powder form with the diamine compound, heating the mixture at a temperature in a range between a temperature not lower than the melting point of the diamine compound and a temperature not higher than the melting point of the polyester resin, so as to effect a preliminary reaction between the polyester resin and the diamine compound, and melting and kneading a reaction product obtained by the preliminary reaction, or (C) by mixing the polyester resin in a powder form with the diamine compound, and heating the mixture at a temperature in a range between a temperature not lower than the melting point of the diamine compound and a temperature not higher than the melting point of the polyester resin.

Examples of the polyester resin used in the method of this embodiment are the same as those described with respect to the above preceding embodiment.

Examples of the diamine compound which reacts with the linear polyester resin according to the method of this embodiment are the same as those described with respect to the above preceding embodiment. In the reaction of the linear polyester resin and the diamine compound without the presence of the reaction medium, the amount of the diamine compound is suitably determined so that the desired polyamide resin can be to advantageously obtained. In general, the amount of the diamine compound is in a range of 0.05–1.5 mol, preferably in a range of 0.08–1.3 mol, more preferably in a range of 0.1–1.2 mol per 1 mol of the linear polyester resin as calculated in the repeating unit thereof. If the amount of the diamine compound is less than 0.05 mol, the obtained polyamide resin does not exhibit the desired properties. On the other hand, if the amount of the diamine compound exceeds 1.5 mol, the molecular weight of the polyamide resin tends to be small. The water content of the diamine compound is generally not larger than 500 ppm, preferably not larger than 100 ppm.

For producing the desired polyamide resin, the linear polyester resin reacts with the diamine compound, so that a portion of, or the entirety of, the diol component of the linear polyester resin is substituted with the diamine compound. In the method of the present embodiment, the reaction is effected without using the reaction medium according to either one of the above-described arrangements (A) through (C), to thereby provide the polyamide resin having the desired properties.

When the polyamide resin is produced according to the above-described arrangement (A), the required amount of the linear polyester resin is initially introduced into a suitable melting and kneading device. To this polyester resin, a portion of the required amount of the diamine compound is added, so that the mixture of the polyester resin and the diamine compound is melted and kneaded upon actuation of the melting and kneading device, whereby the added diamine compound reacts with the polyester resin. When the boiling point or the sublimation temperature of the diamine compound to be used is lower than the melting point of the linear polyester resin, the melting and kneading device is preferably pressure-tightly closed. When the diol component is generated as the reaction by-product, the device is temporarily open to the atmosphere during the melting and kneading process, so as to remove the by-product from the reaction system.

The diamine compound is added to the polyester resin at least two times until the amount of the diamine compound added thereto is equal to the required amount for reaction with the polyester resin. In the present invention, the diamine compound is added to the polyester resin in a suitable number of steps (more than two) depending upon the kinds of the linear polyester resin and the diamine compound, and the degree of the reaction.

The form of the linear polyester resin as the reaction material is not particularly limited. When an extruder is employed as the melting and kneading device as described below, the polyester resin is preferably shaped such that it can be easily introduced into the cylinder of the device through the hopper. In the present arrangement, the air in the melting and kneading device is substituted with a suitable inert gas, and the melting and kneading process is effected in the atmosphere of the inert gas, so that the reaction of the linear polyester resin and the diamine compound is effected in the presence of the inert gas. While any known inert gas such as a helium gas, a nitrogen gas or a krypton gas is used, it is preferable to employ nitrogen gas in the present invention.

The temperature at which the reaction of the polyester resin and the diamine compound is effected by melting and kneading as described above is suitably determined depending upon various factors such as the kinds and the amounts of the reaction materials to be used as well as the reaction time. In general, the reaction temperature is held within a range of 150° C.~400° C., preferably within a range of 200°~350° C.

The reaction time during which the reaction of the linear polyester resin and the diamine compound is effected by melting and kneading is suitably determined by taking account of the kinds and the amounts of the polyester resin and the diamine compound to be used. In general, the reaction time is in a range of 0.1~10 minutes. If the reaction time is less than 0.1 minute, the reaction tends to be insufficient. On the contrary, a reaction time exceeding 10 minutes does not significantly enhance the formation of the polyamide resin.

The melting and kneading device used in the present arrangement needs to be capable of melting and kneading a polymer having a high viscosity under heat in the pressure-tightly closed state while supplying the diamine compound and removing the reaction by-product to and from the reaction system. As such a melting and kneading device, a vent-type extruder or kneader having inlets is preferably used. In particular, a single-screw or multi-screw extruder is preferably used, which permits easy kneading of the polymer at a high temperature and whose cylinder is provided with a plurality of inlets and vents such that each inlet and each vent are alternatively arranged with each other in a direction of extrusion, so that the injection of the diamine compound through the inlets and the retrieval of the reaction product from the vent can be effected repeatedly and successively. The thus constructed extruder wherein each of the inlets and each of the vents are alternatively arranged in the cylinder in the direction of extrusion permits sequential melting and kneading of the reaction materials while adding the diamine compound in steps described above. When the thus constructed extruder is used as the melting and kneading device, it is preferable that the hopper and the screw drive portion be completely filled with the above-described inert gas while keeping the vents at a reduced pressure. In the present arrangement, a plurality of extruders may be connected in series so as to constitute a tandem type melting and kneading device for effecting the melting and kneading of the reaction materials as described above.

When the polyamide resin is produced according to the above-described arrangement (B), the diamine compound and the polyester resin in a powder form as the reaction materials are initially introduced, in the respective required amounts, into a suitable reactor having heating and agitating means. After the atmosphere in the reactor is substituted with a suitable inert gas and the reactor is pressure-tightly closed, the mixture of the diamine compound and the linear polyester resin is heated at a temperature in a range between a temperature not lower than the melting point of the diamine compound and a temperature not higher than the melting point of the linear polyester resin, and agitated preferably at a rotation speed of 100 rpm or more, so as to effect a preliminary reaction of the polyester resin and the diamine compound. According to the preliminary reaction, the diol component in the polyester resin is substituted with the diamine compound. At this stage, the amount of the diol component which has been substituted with the diamine compound is smaller than that in the polyester resin to be obtained as a final product. In producing the polyamide resin, for instance, substantially half of the diol component in the polyester resin is substituted with the diamine compound, in other words, substantially half of the ester group (—COO—) in the polyester resin is substituted with the amide group (—CONH—) after the preliminary reaction.

The polyester resin to be used in the present arrangement is in a powder form, which has been passed through a sieve whose mesh size is not larger than 10, preferably not larger than 50, more preferably not larger than 100. The inert gas is suitably selected from known inert gases including nitrogen gas.

The preliminary reaction of the polyester resin and the diamine compound is effected at a temperature in a range between a temperature not lower than the melting point of the diamine compound and a temperature not higher than the melting point of the linear polyester resin, generally at a temperature in a range of 100° C.~250° C. While the preliminary reaction time varies depending upon the size of the polyester resin powder, the reaction time is generally in a range of 0.5~50 hours, preferably in a range of 1~40 hours, more preferably in a range of 2~30 hours.

Any suitable reactor such as a vertical, horizontal, or rotary type metal reactor, and a high-speed mixer for powder are employed in effecting the preliminary reaction of the polyester resin and the diamine compound, provided that the reactor is provided with an inlet through which the reaction materials are introduced into the reactor and an outlet from which the formed product is retrieved, and that the reactor is capable of heating and agitating the reaction materials while it is pressure-tightly closed after the atmosphere in the reactor has been substituted with the suitably selected inert gas.

In the present arrangement (B), the product obtained by the preliminary reaction is introduced into a suitable melting and kneading device, so that the preliminary reaction product is melted and kneaded for further proceeding the reaction of the polyester resin and the diamine compound, to thereby provide the desired polyamide resin.

Like in the arrangement (A) described above, the atmosphere in the melting and kneading device is substituted with the suitable inert gas in this arrangement, and the reaction of the polyester resin and the diamine compound is effected in the atmosphere of the inert gas.

The temperature at which the preliminary reaction product is melted and kneaded for reaction of the polyester resin and the diamine compound varies depending upon the reaction time as well as the kinds and the amounts of the preliminary reaction product and the reaction materials. In general, the temperature is held in a range of 150~400° C., preferably in a range of 200~350° C. If the temperature is less than 150° C., the preliminary reaction product is not sufficiently melted. On the contrary, if the temperature exceeds 400° C., the formed polyamide resin is thermally decomposed to an excessive extent.

Like the reaction temperature described above, the reaction time varies depending upon various factors. In general, the reaction time is in a range of 0.1~10 minutes. If the reaction time is less than 0.1 minute, the reaction does not sufficiently proceed, while the obtained polyamide resin tends to be gel if the reaction time exceeds 10 minutes.

Any known melting and kneading device such as a roll, extruder, or kneader can be employed, provided that the device is capable of kneading a polymer having a high viscosity under heat. It is particularly preferable to employ a vent-type extruder or kneader which permits easy kneading of the polymer at a high temperature and which assures easy retrieval of the formed polymer. As the extruder, a single-screw or multi-screw extruder is advantageously used. By using such an extruder, the polyamide resin is easily obtained in pellets while removing the reaction by-product through the vent at a reduced pressure.

When the polyamide resin is produced according to the above-described arrangement (C), the linear polyester resin in a powder form and the diamine compound as the reaction materials are initially introduced, in the respective required amounts, into a suitable reactor having heating and agitating means. After the atmosphere in the reactor is substituted with an inert gas such as a nitrogen gas and the reactor is pressure-tightly closed, the reaction materials in the reactor are heated at a temperature in a range between a temperature not lower than the melting point of the diamine compound and a temperature not higher than the melting point of the polyester resin while being agitated preferably at a rotation speed of 100 rpm or more, so that the diol component in the polyester resin is substituted with the diamine compound.

The method according to this arrangement (C) is effective to produce the polyamide resin, e.g., all aromatic polyamide resin, whose melting point is close to, or higher than its thermal decomposition temperature rendering its production by melting and kneading as effected in the above-described arrangement (A) and (B) impossible.

The reaction of the polyester resin and the diamine compound is effected at a temperature in a range between a temperature not lower than the melting point of the diamine compound and a temperature not higher than the melting point of the polyester resin, generally in a range of 150° C.~250° C. The reaction time is suitably determined depending upon the kinds of the linear polyester resin and the diamine compound used as the reaction materials. In general, the reaction time is in a range of 1~100 hours, preferably in a range of 2~80 hours, more preferably 4~50 hours. In the method according to the present arrangement (C), the reaction temperature is higher, and the reaction time is longer, than those in the method according to the above-described arrangement (B).

The reactor similar to that used for the preliminary reaction in the above-described arrangement (B) may be advantageously used for the reaction according to the present arrangement (C).

When the polyamide resin is produced according to the arrangements (A) through (C), the formed polyamide resin generally has an intrinsic viscosity of 0.3~2.0 dl/g, in other words, it has a high degree of polymerization degree, i.e., a high molecular weight. In essence, the above-described arrangements (A) through (C) permit easy production of the polyamide resin having a desired high molecular weight without using a specific solvent as the reaction medium in the reaction of the polyester resin and the diamine compound.

When the polyamide resin is produced according to the above-described arrangements (A) through (C), at least one of the carboxylic acid-activator and the inorganic salt is present in the reaction system of the linear polyester resin and the diamine compound. The reaction of the linear polyester resin and the diamine compound proceeds in the presence of the carboxylic acid-activator and/or the inorganic salt, whereby the polyamide resin to be obtained has a high degree of yield while effectively avoiding or minimizing its gelation and decomposition.

Examples of the carboxylic acid-activator present in the reaction system are the same as described with respect to the above first embodiment wherein the polyester resin and the diamine compound react in the specific solvent as the reaction medium. The amount of the carboxylic acid-activator used herein is suitably determined so as to assure the advantages described above. In general, the carboxylic acid activator is present in the reaction system in an amount of 0.001~0.2 mol, preferably in an amount of 0.01~0.1 mol, per 1 mol of the linear polyester resin as calculated in the repeating unit thereof. If the amount of the carboxylic acid-activator is less than 0.001 mol, the effect to be attained by the addition of the carboxylic acid-activator is insufficient. An amount of the carboxylic acid-activator exceeding 0.2 mol does not significantly enhance the effect.

Examples of the inorganic salt present in the reaction system are the same as described with respect to the above first embodiment. The amount of the inorganic salt used herein is suitably determined so as to assure the advantages described above. In general, the inorganic salt is present in the reaction system in an amount of 0.01~10 parts by weight, preferably in an amount of 0.1~5 parts by weight, per 100 parts by weight of the linear polyester resin. If the amount of the inorganic salt is less than 0.01 part by weight, the effect to be attained by the addition of the inorganic salt is insufficient. The amount of the inorganic salt exceeding 10 parts by weight does not significantly enhance the effect To the polyamide resin obtained according to the present invention, there are added, as needed, various known additives such as a heat stabilizing agent, a light stabilizing agent, a coloring agent, a lubricant, a reinforcing agent, and a filler. Any one of, or any combination of, the additives may be added. Then, the polyamide resin is formed into a desired product according to a known molding method such as compression molding, injection molding or extrusion. The polyamide resin may be used for forming a fiber or a film by casting, or a coating layer while the polyamide resin is dissolved in a suitable solvent.

EXAMPLES

To further clarify the present invention, there will be described some examples of the invention. It is to be understood that the present invention is not limited to the details of the following examples, but may be embodied with various changes, modifications, and improvements which may occur to those skilled in the art without departing from the scope of the invention defined in the attached claims.

Example 1

Commercially available bottles made of a PET resin were collected and washed. Then, the PET bottles were pulverized and passed through a 10-mesh sieve. The thus obtained recycled PET resin powder was dried at 130° C. for three hours. The water content of the dried PET resin powder (measured by a measuring device available from MITSUBISHI CHEMICALS CO., LTD., Japan) was 100 ppm. The intrinsic viscosity [η] of the obtained PET resin powder was 0.65 dl/g. Hexamethylene diamine (HMD) as the diamine compound, which is available from WAKO JUNYAKU KOGYO CO., LTD., Japan, was passed through a packed column of a molecular sieve 4A (available from WAKO JUNYAKU KOGYO CO., LTD., Japan) and dried. After metal sodium was added to the thus dried diamine compound, it was distilled at a reduced pressure and purified. As the reaction medium, there was prepared dehydrated N-methylpyrrolidone (NMP; used for organic synthesis and available from WAKO JUNYAKU KOGYO CO., LTD., Japan). As the carboxylic acid-activator and the inorganic salt, there were respectively prepared triphenyl phosphite (TPP; available from WAKO JUNYAKU KOGYO CO., LTD., Japan) and lithium chloride (LiCl; an anhydrous product available from WAKO JUNYAKU KOGYO CO., LTD., Japan). TPP was distilled at a reduced pressure and purified after it had been dehydrated by using the molecular sieve 4A described above, while LiCl was vacuum-dried at a temperature of 200° C. at a pressure of 1 Torr for twelve hours.

40 g of the PET resin powder prepared as described above and 24.2 g of the purified HMD were introduced into a 300 mL-capacity autoclave, together with 200 g of NMP, and TPP and/or LiCL in the respective amounts as indicated in the following Table 1. After the autoclave was pressure-tightly closed and pressurized to 2 kg/cm$^2$, the mixture in the autoclave was heated while it was stirred at 300 rpm. The mixture was held at 200° C. for five hours. Thereafter, the temperature of the autoclave was lowered to the room temperature. After adding 500 mL of purified water to each of the obtained reaction solutions, it was subjected to filtration. To this filtrate, 500 mL of acetone was added, and the mixture was subjected to filtration. The obtained filtrate was vacuum-dried at 120° C. for 12 hours, to thereby provide reaction product specimens Nos. 1–3 each in a white powder form. Each specimen was heated at 200° C. for one hour under vacuum at 1 Torr, in other words, each specimen was subjected to the solid-polycondensation. A comparative specimen No. 1 was obtained in a manner similar to that described above, except that TPP as the carboxylic acid-activator and LiCl as the inorganic salt were not used.

The infrared analysis of the thus obtained reaction product specimens Nos. 1–3 of the present invention and comparative specimen No. 1 revealed that the absorbance of the ester groups was not recognized at the absorption wave number band of 1720 cm$^{-1}$. Judging from this fact, it is recognized that the PET resin was completely formed into the amide resin. For each of these specimens, the yield was calculated and the results are also shown in Table 1. The yield which is expressed in percentage represents a ratio of the actual yield with respect to the stoichiometric amount on the assumption that all ester groups are converted into amide groups. As is apparent from the results indicated in Table 1, the specimens Nos. 1–3 according to the present invention advantageously attained a higher degree of yield than that of the comparative specimen No. 1. Each specimen was dissolved in hexafluoroisopropanol to examine whether or not the specimen suffered from gelation and to measure the intrinsic viscosity [η]. As is clear from the results indicated in Table 1, the comparative specimen No.1 suffered from gelation, rendering the measurement of its intrinsic viscosity impossible. In contrast, the specimens Nos. 1–3 according to the present invention did not suffer from gelation and had sufficiently high intrinsic viscosity values. Therefore, it is recognized that each of the specimens Nos. 1–3 of the present invention had a significantly high molecular weight.

TABLE 1

| | TPP (g) | LiCl (g) | yield (%) | gelation | [η] (dl/g) |
|---|---|---|---|---|---|
| Present Invention | | | | | |
| 1 | 3.2 | — | 99.1 | not observed | 0.78 |
| 2 | — | 3 | 100.2 | not observed | 0.61 |
| 3 | 3.2 | 3 | 99.8 | not observed | 0.82 |
| comparative example | | | | | |
| 1 | — | — | 92.2 | observed | ✗ |

✗: The intrinsic viscosity could not be measured due to gelation.

Example 2

A reaction product specimen No. 4 and a comparative specimen No. 2 were obtained in a manner similar to that in the above Example 1, except that the reaction materials were heated at 150° C. for 10 hours, using 80 g of dehydrated acetonitrile (for organic synthesis and available from WAKO JUNYAKU KOGYO CO., LTD., Japan) as the reaction medium in place of NMP used in the Example 1.

The infrared analysis of the thus obtained reaction product specimens revealed that both specimens were completely formed into the polyamide. As in the above Example 1, the physical properties of the specimen No. 4 of the present invention and the comparative specimen No. 2 were examined and the results are indicated in the following Table 2.

As is apparent from the results indicated in Table 2, the specimen No. 4 of the present invention was superior in view of the yield and the intrinsic viscosity, i.e., the molecular weight, to the comparative specimen No. 2, though none of the specimen No. 4 of the present invention and the comparative specimen No. 2 suffered from gelation.

TABLE 2

| | TPP (g) | LiCl (g) | yield (%) | gelation | [η] (dl/g) |
|---|---|---|---|---|---|
| Present invention | | | | | |
| 4 | 3.2 | 3 | 100 | not observed | 0.76 |
| Comparative example | | | | | |
| 2 | — | — | 85 | not observed | 0.4 |

Example 3

After metal sodium was added to p-phenylenediamine (PDA; available from WAKO JUNYAKU KOGYO CO., LTD., Japan) as the diamine compound, it was distilled at a reduced pressure and purified. To a four neck glass flask having agitating means, there were introduced 20 g of the PET resin powder as used in the above Example 1, 11 g of the purified PDA, 100 g of NMP, TPP or diphosphorus pentaoxide ($P_2O_5$; available from WAKO JUNYAKU KOGYO CO., LTD., Japan), and/or calcium chloride ($CaCl_2$; available from WAKO JUNYAKU KOGYO CO., LTD., Japan), which $CaCl_2$ had been vacuum-dried at a temperature of 200° C. at a pressure of 1 Torr for 12 hours. The amounts of TPP, $P_2O_5$, and $CaCl_2$ are indicated in the following Table 3. The mixture in the flask was heated at 200° C. for 10 hours by a stream of the nitrogen gas (140 mL/minute). 500 mL of acetone was added to each of the obtained reaction solutions, to thereby precipitate the reaction product. Then, the reaction product was subjected to filtration. After adding 500 mL of purified water to each of the obtained filtrates, it was vacuum-dried at a temperature of 120° C. and at a pressure of 1 Torr, so that reaction product specimens Nos. 5–8 according to the present invention and a comparative specimen No. 3 were obtained. The obtained reaction product specimens were in an amber powder form. Subsequently, each of the specimens was heated at 300° C. for one hour in the atmosphere of the nitrogen gas, in other words, each specimen was subjected to solid-polycondensation.

Each of the specimens was measured to determine its yield and amidation ratio, and inspected for gelation when it was dissolved in 98% concentrated sulfuric acid. The intrinsic viscosity [η] at 30° C. was also measured for each specimen after the heat-treatment described above. The results of the measurement are also indicated in Table 3.

TABLE 3

| | carboxylic acid-activator | | | reaction product amidation | | | After heat-treatment | |
|---|---|---|---|---|---|---|---|---|
| | TPP (g) | P₂O₅ (g) | CaCl₂ (g) | yield (%) | ratio*¹ (%) | gelation | gelation | [η] (dl/g) |
| Present invention | 5 | 5 | — | — | 103 | 82 | not observed | slightly observed | 0.55*² |
| | 6 | — | 2 | — | 104 | 85 | not observed | slightly observed | 0.60*² |
| | 7 | — | — | 15 | 99 | 97 | not observed | not observed | 1.0 |
| | 8 | — | 2 | 15 | 99 | 98 | not observed | not observed | 1.5 |
| Comparative example | 3 | — | — | — | 46 | 60 | not observed | observed | 0.21*² |

*¹: amidation ratio (%) = [λ₁₅₂₀/(λ₁₅₂₀ + λ₁₇₂₀)] × 100
$\lambda_{1520}$: absorbency of infrared spectrum at 1520 cm⁻¹ (the amide group)
$\lambda_{1720}$: absorbency of infrared spectrum at 1720 cm⁻¹ (the ester group)
*²: The intrinsic viscosity was measured after the gel was removed by filtration through a stainless mesh (mesh size: 500).

As is apparent from the results indicated in Table 3, the specimens Nos. 5–8 of the present invention had high yields as well as high amidation ratios, and those specimens had large molecular weights without suffering from gelation even after the heat-treatment (the solid-polycondensation). Accordingly, the polyamide resin produced according to the present method is less likely to suffer from gelation as compared with that produced according to the conventional method, and has a significantly enhanced yield.

Example 4

As the dLamine compound, there was prepared polydimethyl siloxane having amino groups at its opposite ends (which is a modified silicone available as "X-22-161AS" from Shinetsu Kagaku Kogyo, Co., Ltd., Japan and having a molecular weight of 900). After this polydimethyl siloxane was dehydrated by using the molecular sieve 4A, it was distilled at a reduced pressure and purified. As the reaction solvent, there was prepared o-dichlorobenzene (available from WAKO JUNYAKU KOGYO CO., LTD., Japan). After this o-dichlorobenzene was dehydrated by using the molecular sieve 4A, it was distilled and purified. To the 300 mL-capacity autoclave as used in the above Example 1, there were introduced 40 g of the dried PET resin powder as used in the Example 1, 18.7 g of the purified diamine compound in an amount corresponding to 0.1 mol with respect to 1 mol of the PET resin as calculated in the repeating unit thereof 200 g of the purified o-dichlorobenzene, and 6 g of TPP. The autoclave was pressure-tightly closed, and the mixture in the autoclave was heated at 200° C. for 20 hours. After adding 500 mL of ethanol to the reaction solution, it was subjected to filtration. The obtained filtrate was vacuum-dried at a temperature of 120° C. at a pressure of 1 Torr for 12 hours, so that 54 g of a reaction product was obtained in a beige powder form. This reaction product (specimen No. 9 according to the present invention) showed an infrared spectrum having a double peak peculiar to the siloxane bond in the absorbance wave number band of 1020~1100 cm⁻¹. In a manner similar to that described above, except that TPP was not used, 38 g of a reaction product (comparative specimen No. 4) was obtained in a white powder form. The absorbance peak of the infrared spectrum of this comparative specimen No. 4 was smaller than that of the specimen No. 9 obtained according to the present invention.

Example 5

A reaction product specimen No. 10 was obtained as follows. Initially, there was prepared the reaction product in a white powder form which was obtained according to the same manner as in the above Example 1 for obtaining the comparative specimen No. 1, except for the solid-polycondensation. 20 g of the thus obtained white powder reaction product was mixed with 20 g of acetone solution which includes TPP at a concentration of 10 wt. %. After the acetone was substantially evaporated from the mixed solution at the room temperature, the solution was vacuum-dried at 50° C. at a reduced pressure of 1 Torr, to thereby provide the reaction product specimen No. 10 in the form of polyamide-TPP mixed powder. For comparison, there was prepared a comparative specimen No. 5 which was obtained in the same manner as in the above Example 1 for obtaining the comparative specimen No. 1, except for the solid-polycondensation.

Each of the specimen No. 10 of the present invention and the comparative specimen No. 5 was introduced into a high-temperature melt indexer (available from TECHNOL SEVEN CO., LTD., Japan) whose atmosphere was completely substituted with the nitrogen gas, and was subjected to a heat-treatment (i.e., solid-polycondensation) at 320° C. for one minute. Thereafter, each specimen was extruded. The specimen No. 10 of the present invention was extruded without any trouble, and the inspection of the extruded specimen which was dissolved in hexafluoroisopropanol revealed that the specimen did not suffer from gelation. In contrast, the comparative specimen No. 5 was hard to extrude because it suffered from thermal decomposition.

Example 6

Commercially available bottles made of a PET resin were collected and washed. Then, the PET bottles were pulverized and passed through a 10-mesh sieve. The thus obtained recycled PET resin powder was dried at 150° C. for three hours. The water content of the dried PET resin powder (measured by a measuring device available from MITSUBISHI CHEMICALS, CO., LTD., Japan) was 80 ppm. The intrinsic viscosity [η] of the obtained PET resin powder (as measured at a temperature of 30° C. by using hexafluoroisopropanol) was 0.65 dl/g, and its melting point was 251° C.

As an extruder, there was used a twin-screw extruder ("2D25W available from TOYO SEIKI SEISAKUSHO, Japan) having two inlets and two vents which are disposed in a cylinder such that each inlet and each vent are alternately arranged with each other in the axial direction of the cylinder. The inside of the cylinder was completely filled with nitrogen gas by substituting the atmosphere therein with nitrogen gas. Then, the PET resin powder prepared as described above was put into the hopper provided on the extruder. The cylinder temperature was set such that the temperature gradually increased from 240° C. to 320° C. in a direction from the lower end of the hopper toward the top end of the die. The screws were rotated at 70 rpm. The PET resin powder was supplied from the hopper into the cylinder at a rate of 30 g/minute with the two vents being placed at a reduced pressure of 500 mmHg. In this state, hexamethylene diamine (HMD; available from WAKO JUNYAKU KOGYO CO., LTD., Japan and having a melting point of 41° C.) kept at 50° C. was added into the cylinder at a rate of 7 g/minute through each of the vents, such that the molar ratio of HMD with respect to the PET resin was equal to 0.77 (wherein the molar amount of the PET resin was calculated in the repeating unit thereof). After the mixture of the PET resin and HMD was melted and kneaded in the cylinder by rotation of the screws, it was extruded through the die. The extruded product (sample) was cooled in water immediately after the extrusion.

The thus obtained sample was subjected to the infrared analysis and its intrinsic viscosity was measured at a temperature of 30° C. using hexafluoroisopropanol as a solvent. It was confirmed that the obtained sample was a polyesteramide resin whose amidation ratio was 60% and which had an intrinsic viscosity of 0.48 dl/g.

For comparison, a mixture of 600 g of the PET resin powder and 280 g of HMD which were the same as described above were introduced into the hopper provided on the extruder similar to that described above with its inlets and vents being closed. The extruder was operated at the same cylinder temperature and the screw rotation speed as those described above. The mixture in the hopper was supplied into the cylinder at a rate of 30 g/minute, so that the mixture was melted and kneaded. In this comparative experiment, however, it was observed that HMD flew back toward the hopper and that an abnormal substance was emitted from the die together with a gas.

Example 7

1 kg of the PET resin powder as used in the above Example 6 was mixed with 15 g of triphenyl phosphite as the carboxylic acid-activator (available from WAKO JUNYAKU KOGYO CO., LTD., Japan) and 10 g of copper iodide as the inorganic salt (available from WAKO JUNYAKU KOGYO CO., LTD., Japan). The thus obtained mixture was introduced into the hopper, and it was melted and kneaded in a manner similar to that in Example 6, so as to provide a sample. The obtained sample was subjected to infrared analysis and its intrinsic viscosity was measured. It was confirmed that the obtained sample was a polyesteramide resin whose amidation ratio was 71% and which had an intrinsic viscosity of 0.56 dl/g.

Example 8

1 kg of the PET resin powder as used in the above Example 6 was mixed with 604 g of HMD such that they were mixed with each other in equivalent molar amounts. The mixture was introduced into a 5L-capacity autoclave which was filled with nitrogen gas. After the autoclave was closed while it was pressurized at 5 kg/cm$^2$, the autoclave was heated at 150° C. in oil bath with the mixture in the autoclave being agitated at 180 rpm by anchor-shaped blades provided on its bottom portion, so that the mixture preliminarily reacted. After the mixture was subjected to the preliminary reaction for five hours, the temperature of the autoclave was lowered to the room temperature. The thus obtained preliminary reaction product was subjected to infrared analysis and its intrinsic viscosity was measured. It was confirmed that the preliminary reaction product was a polyesteramide resin whose amidation ratio was 48% and which had an intrinsic viscosity of 0.16 dl/g.

The polyester amide resin obtained as described above was introduced into the hopper provided on the extruder as used in the above Example 6 with its vents being closed. After the cylinder of the extruder was filled with nitrogen gas, the extruder was operated at the same cylinder temperature and the screw rotation speed as those in the above Example 6, and the preliminary reaction product in the hopper was supplied into the cylinder at a rate of 30 g/minute, so that the preliminary reaction product was melted and kneaded. Thereafter, the preliminary reaction product was extruded from the die. The extruded product (sample) was cooled in water immediately after the extrusion. The sample was subjected to infrared analysis and its intrinsic viscosity was measured. It was confirmed that the sample was a polyamide resin whose amidation ratio was 100% and which had an intrinsic viscosity of 0.56 dl/g.

Example 9

1 kg of the pulverized PET resin powder (which had been passed through the 100-mesh sieve) as used in the above Example 8, 141 g of p-phenylene diamine (available from WAKO JUNYAKU KOGYO CO., LTD., Japan and having a melting point of 147° C.), and 422 g of m-phenylene diamine (available from WAKO JUNYAKU KOGYO CO., LTD., Japan and having a melting point of 63° C.) were introduced into the 5L-capacity autoclave as used in Example 8 which was filled with nitrogen gas. After the autoclave was closed while it was pressurized at 5 kg/cm$^2$, the autoclave was heated at 200° C. in oil bath for 10 hours with the mixture in the autoclave being agitated at 180 rpm. Thereafter, the temperature of the autoclave was lowered to the room temperature, and the obtained reaction product (sample) was taken out of the autoclave. The thus obtained sample was subjected to infrared analysis and its intrinsic viscosity was measured at 30° C. using N-methyl-2-pylTolidone as a solvent. It was confirmed that the sample was a polyesteramide resin whose amidation ratio was 95% and which had an intrinsic viscosity of 0.51 dl/g.

What is claimed is:

1. A method of producing a polyamide resin by reacting with at least one diamine compound, at least one linear polyester resin consisting of at least one dicarboxylic acid component and at least one diol component and having an intrinsic viscosity of not less than 0.2 dl/g, so that said at least one diol component of said linear polyester resin is substituted by said diamine compound, resulting in said polyamide resin as a reaction product, wherein the improvement comprises:

at least one of a carboxylic acid-activator, in an amount of 0.01–0.5 mol per 1 mol of said linear polyester resin as calculated in the repeating unit thereof, and an inorganic salt, formed of metal ions selected from the group consisting of an alkaline metal ion, alkaline earth metal ion, transition metal ion and anions selected from the group consisting of chloride ions, bromide ions, and iodide ions, being present in a reaction system of said linear polyester resin and said diamine compound said linear polyester resin reacting with said diamine compound in a reaction medium comprising at least one solvent selected from aprotic solvents.

2. A method according to claim 1 further comprising a step of effecting polycondensation in a solid state or molten state on said reaction product.

3. A method according to claim 1, wherein said inorganic salt is used in an amount of 0.1–30 parts by weight per 100 parts by weight of said aprotic solvent.

4. A method of producing a polyamide resin by reacting with at least one diamine compound, at least one thermoplastic polyalkylene terephthalate resin consisting of at least one dicarboxylic acid component and at least one diol component and having an intrinsic viscosity of not less than 0.2 dl/g, so that said at least one diol component of said thermoplastic polyalkylene terephthalate resin is substituted by said diamine compound, resulting in said polyamide resin as a reaction product, wherein the improvement comprises;
at least one of a carboxylic acid-activator and an inorganic salt, said inorganic salt being formed of metal ions selected from the group consisting of an alkaline metal ion, alkaline earth metal ion, transition metal ion and anions selected from the group consisting of chloride ions, bromide ions, and iodide ions, being present in a reaction system of said thermoplastic polyalkylene terephthalate resin and said diamine compound;
the method further comprising a step of melting and kneading reaction materials which include said thermoplastic polyalkylene terephthalate resin, said diamine compound, and said at least one of said carboxylic acid-activator and said inorganic salt.

5. A method according to claim 4, wherein said thermoplastic polyalkylene terephthalate resin is a polyethylene terephthalate resin.

6. A method of producing a polyamide resin by reacting with at least one diamine compound, at least one thermoplastic polyalkylene terephthalate resin consisting of at least one dicarboxylic acid component and at least one diol component and having an intrinsic viscosity of not less than 0.2 dl/g, so that said at least one diol component of said thermoplastic polyalkylene terephthatate resin is substituted by said diamine compound, resulting in said polyamide resin as a reaction product, wherein the improvement comprises:
at least one of a carboxylic acid-activator and an inorganic salt, said inorganic salt being formed of metal ions selected from the group consisting of an alkaline metal ion, alkaline earth metal ion, transition metal ion and anions selected from the group consisting of chloride ions, bromide ions, and iodide ions, being present in a reaction system of said thermoplastic polyalkylene terephthalate resin and said diamine compound;
said thermoplastic polyalkylene terephthalate resin being used in a powder form and reacting with said diamine compound at a temperature in a range between a temperature not lower than a melting point of said diamine compound and a temperature not higher than a melting point of said thermoplastic polyalkylene terephthalate.

7. A method according to claim 6, wherein said thermoplastic polyalkylene terephthalate resin is a polyethylene terephthalatc resin.

8. A method according to claim 4, wherein said diamine compound is used in an amount of 0.05–1.5 mol per 1 mol of said thermoplastic polyalkylene terephthalate resin as calculated in the repeating unit thereof.

9. A method according to claim 4, wherein said carboxylic-acid activator is used in an amount of 0.001–0.2 mol per 1 mol of said thermoplastic polyalkylene terephthalate resin as calculated in the repeating unit thereof.

10. A method according to claim 4, wherein said inorganic salt is used in an amount of 0.01–10 parts by weight per 100 parts by weight of said thermoplastic polyalkylene terephthalate resin.

11. A method according to claim 4, wherein said step of melting and kneading said reaction materials is effected while adding said diamine compound to said thermoplastic polyalkylene terephthalate resin at least two times until an amount of said diamine compound added to said thermoplastic polyalkylene terephthalate resin is equal to a required amount for reaction with said thermoplastic polyalkylene terephthalate resin.

12. A method according to claim 4, wherein said step of melting and kneading said reaction materials is effected after mixing said thermoplastic polyalkylene terephthalate resin in a powder form with said diamine compound, and heating said reaction materials at a temperature in a range between a temperature not lower than a melting point of said diamine compound and a temperature not higher than a melting point of said thermoplastic polyalkylene terephthalate resin, so as to effect a preliminary reaction between said thermoplastic polyalkylene terephthalate resin and said diamine compound.

13. A method according to claim 4, wherein said step of melting and kneading said reaction materials is effected in an atmosphere of an inert gas.

14. A method according to claim 6, wherein said thermoplastic polyalkylene terephthalate resin reacts with said diamine compound in an atmosphere of an inert gas.

15. A method according to claim 1, wherein said linear polyester resin is a thermoplastic polyalkylene terephthalate resin.

16. A method according to claim 15, wherein said thermoplastic polyalkylene terephthalate resin is a polyethylene terephthalate resin.

17. A method of producing a polyamide resin comprising the steps of:
reacting with at least one diamine compound, at least one linear polyester resin consisting of at least one dicarboxylic acid component and at least one diol component and having an intrinsic viscosity of not less than 0.2 dl/g, said linear polyester resin and said diamine compound being reacted in a reaction medium comprising at least one solvent selected from aprotic solvents, so that said at least one diol component of said linear polyester resin is substituted by said diamine compound, so as to provide a reaction product;
adding at least one of a carboxylic acid-activator and an inorganic salt to said reaction product; and
effecting polycondensation in a solid state or molten state on said reaction product to which at least one of said carboxylic acid-activator and said inorganic salt has been added.

18. A method according to claim 17, wherein said carboxylic acid-activator is used in an amount of 0.1–20 parts by weight per 100 parts by weight of said reaction product.

19. A method according to claim 17, wherein said inorganic salt is uded in an amount of 0.1–10 parts by weight per 100 parts by weight of said reaction product.

20. A method according to claim 17, wherein said linear polyester resin is a thermoplastic polyalkylene terephthalate resin.

21. A method according to claim 20, wherein said thermoplastic polyalkylene terephthalate resin is a polyethylene terephthalate resin.

22. A method of producing a polyamide resin by reacting with at least one diamine compound, at least one linear polyester resin consisting of at least one dicarboxylic acid component and at least one diol component and having an intrinsic viscosity of not less than 0.2 dl/g, wherein the improvements comprises:

said diamine compound being added to said linear polyester resin at least two times until an amount of said diamine compound added to said linear polyester resin is equal to a required amount for reaction with said linear polyester resin while a mixture of said linear polyester resin and said diamine compound is melted and kneaded.

23. A method according to claim 22, wherein said mixture of said linear polyester resin and said diamine compound is melted and kneaded in an atmosphere of an inert gas.

24. A method according to claim 22, wherein said diamine compound is used in an amount of 0.05–1.5 mol per 1 mol of said linear polyester resin as calculated in the repeating unit thereof.

25. A method of producing a polyamide resin by reacting with at least one diamine compound, at least one linear polyester resin consisting of at least one dicarboxylic acid component and at least one diol component and having an intrinsic viscosity of not less than 0.2 dl/g, said method comprising the steps of:

mixing said linear polyester resin in a powder form with said diamine compound;

heating a mixture of said linear polyester resin and said diamine compound at a temperature in a range between a temperature not lower than a melting point of said diamine compound and a temperature not higher than a melting point of said linear polyester resin, so as to effect a preliminary reaction between said linear polyester resin and said diamine compound; and melting and kneading a reaction product obtained by said preliminary reaction for further proceeding a reaction between said linear polyester resin and said diamine compound.

26. A method according to claim 25, wherein said step of melting and kneading said reaction product obtained by said preliminary reaction is effected in an atmosphere of an inert gas.

27. A method according to claim 25, wherein said diamine compound is used in an amount of 0.05–1.5 mol per 1 mol of said linear polyester resin as calculated in the repeating unit thereof.

28. A method of producing a polyamide resin by reacting with at least one diamine compound, at least one linear polyester resin consisting of at least one dicarboxylic acid component and at least one diol component and having an intrinsic viscosity of not less than 0.2 dl/g, said method comprising the steps of:

mixing said linear polyester resin in a powder form with said diamine compound; and heating a mixture of said linear polyester resin and said diamine compound at a temperature in a range between a temperature not lower than a melting point of said diamine compound and a temperature not higher than a melting point of said polyester resin.

29. A method according to claim 28, wherein said step of heating said mixture is effected in an atmosphere of an inert gas.

30. A method according to claim 28, wherein said diamine compound is used in an amount of 0.05–1.5 mol per 1 mol of said linear polyester resin as calculated in the repeating unit thereof.

* * * * *